United States Patent
Dung

(10) Patent No.: US 7,939,753 B2
(45) Date of Patent: May 10, 2011

(54) CABLE HEAD FOR ASSEMBLY IN A CONDUIT OF A WATER-COOLED, HIGH CURRENT CABLE

(76) Inventor: Arndt Dung, Hagen (DE)

( * ) Notice: Subject to any disclaimer, the term of this patent is extended or adjusted under 35 U.S.C. 154(b) by 603 days.

(21) Appl. No.: 11/990,345

(22) Filed: Feb. 8, 2008

(65) Prior Publication Data
US 2010/0193213 A1  Aug. 5, 2010

(30) Foreign Application Priority Data
Feb. 15, 2007  (EP) ..................... 07003211

(51) Int. Cl.
*H01B 9/06*  (2006.01)
(52) U.S. Cl. ..................... 174/15.1; 174/15.6
(58) Field of Classification Search ............ 174/15.1, 174/15.6, 19, 74 R, 20
See application file for complete search history.

(56) References Cited

U.S. PATENT DOCUMENTS

| | | | | |
|---|---|---|---|---|
| 3,551,581 A | * | 12/1970 | Goodman | 174/15.7 |
| 3,601,520 A | * | 8/1971 | Carasso | 174/15.7 |
| 3,801,724 A | * | 4/1974 | Goodman | 174/15.7 |
| 4,018,976 A | * | 4/1977 | Grove | 174/19 |
| 4,199,653 A | * | 4/1980 | Talley | 174/15.7 |
| 4,487,990 A | * | 12/1984 | Lane et al. | 174/15.7 |
| 5,484,960 A | * | 1/1996 | Langhenry et al. | 174/74 R |
| 5,527,994 A | * | 6/1996 | Kasper | 174/74 R |
| 5,581,878 A | * | 12/1996 | Langhenry et al. | 29/860 |
| 6,100,467 A | * | 8/2000 | Kroulik | 174/15.1 |

* cited by examiner

*Primary Examiner* — William H Mayo, III
(74) *Attorney, Agent, or Firm* — Louis Ventre, Jr.

(57) ABSTRACT

A compact cable head for assembly in a conduit of a water-cooled, high current cable includes a cable side end to receive conductors; a first circumferential section with saw tooth ribbing to be engaged by clips on the conduit; and a second circumferential region adjacent thereto and configured with a knurled circumferential face to be engaged by clips on the conduit.

4 Claims, 2 Drawing Sheets

CABLE HEAD FOR ASSEMBLY IN A CONDUIT OF A WATER-COOLED, HIGH CURRENT CABLE

The invention relates to the assembly of the conduit of a water-cooled, high current cable including the compact cable head. Water-cooled, high current cables are used more especially in connection with the supply of power for arc welding furnaces.

In this case, the high current cable, also then the assembly of the conduit of the water-cooled, high current cable including the cable heads, is subject in routine operation to tensile stresses, crushing stresses and torsional stresses that can be traced back to the lowering and raising of the electrode support arm and also to its pivoting. The said stresses cause problems for the assembly of the conduit of the water-cooled, high current cable with its compact cable heads.

In recent years, the conduit surrounding the high current cable has been secured with clips against the cable head (DE 34 20 821 C1), in conjunction therewith the cable head has then already been provided with circular grooves into which the conduit is pressed.

More recently, saw tooth ribbing has been provided with tooth flanks facing towards the cable side for stabilizing the clamping of the conduit on the cable head using clips (U.S. Pat. No. 4,487,990A and brochure "Flohe-High Current Cable", Jg 1998). The saw tooth ribbing blocks axial stresses that work on the clamping of the conduit, however, due to the torsional stresses that still occur, the result again and again is the appearance of wear and tear and this has a negative effect on the service life of this assembly of the cable conduit with the cable head.

Proceeding from the state of the art, it has been the object of the invention to realize an assembly of the conduit of a water-cooled, high-current cable including the compact cable head, also to reduce the disadvantageous influences of torsional stresses on the assembly of the conduit with the cable head that still remain even when saw tooth ribbing is used and, consequently, to continue to improve the service life of the assembly.

The object is achieved with the assembly of the conduit of a water-cooled, high current cable by an additional region of the cable head adjacent the region that is provided with saw tooth ribbing, the circumferential face of which additional region is knurled, the said conduit being pressed against this region by means of clamps or respectively clips affixed in this region.

Variants of the invention are addressed in sub claims 2 and 3.

The combination according to the invention of the saw tooth ribbing that effects the positional stability of the conduit on the cable head relative to axial stresses and the additionally provided knurling that blocks torsional stresses of the conduit, leads to a not hitherto achievable service life of the assembly of the conduit surrounding the water-cooled, high current cable with the cable head, with the positive result of reduced down times of the unit to be supplied with the high current.

The invention is explained in more detail in the drawing.

Figure 1:
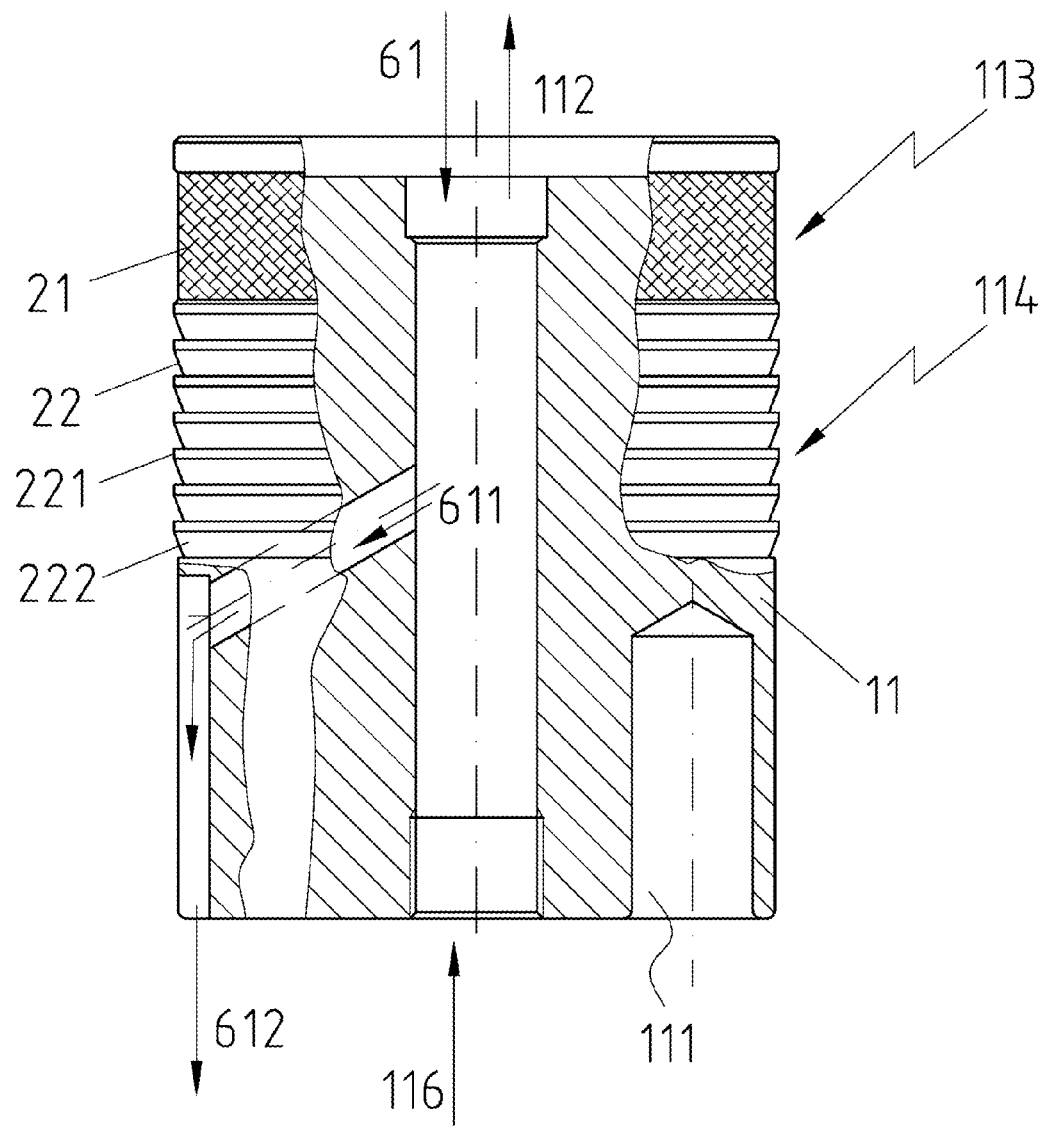
FIG. 1 is a longitudinal section of the new cable head.

The compact cable head has the reference 11, the receiving means for the conductors of the high current cable (not shown) situated in the cable head have the reference 111.

On the connection side (112), the cable head 11 includes a first region 113, which is provided with a knurling 21, the region 114 provided with obtuse (221) saw tooth ribbing 22 connecting to the region 113.

The conduit 31 pulled over the cable head 11 (FIG. 2) is secured against the cable head by means of clips (cable clips) 41 and 42 that are affixed in the knurled region 113 and in the ribbed region 114.

Figure 2:
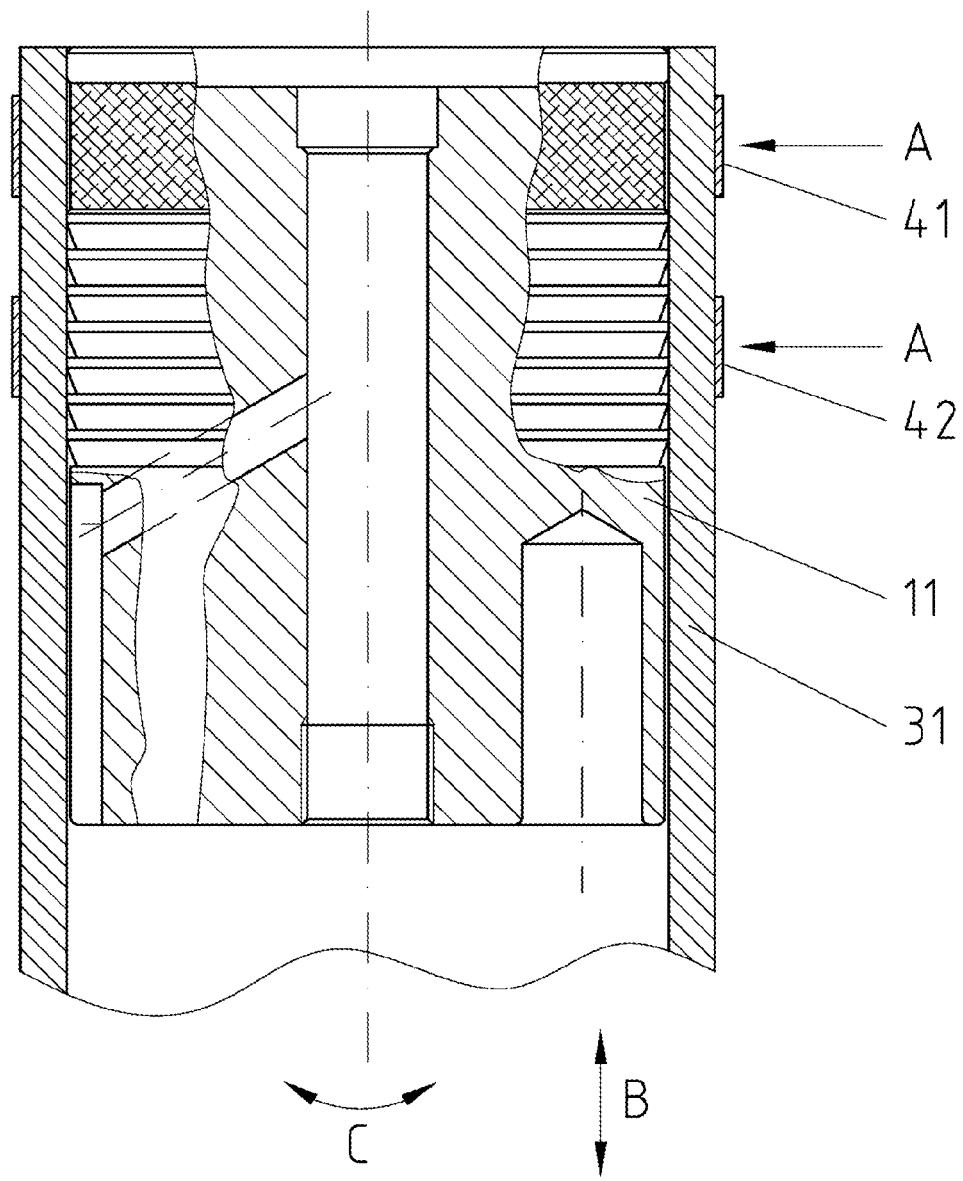
FIG. 2 is representation corresponding to FIG. 1 with the end of the conduit pulled onto the cable head.

The tightened clips 41 and 42 press the conduit 31 against the regions 113 and 114 of the cable head (arrows A in FIG. 2).

The saw tooth ribbing 22 blocks relative movements between cable head 11 and cable conduit 31 in the axial direction (double arrow B in FIG. 2).

The knurled (21) region 113 of the cable head 11 blocks relative movements caused by torsional stresses (double arrow C in FIG. 2) between cable head 11 and cable conduit 31.

The tooth flanks 222 of the saw tooth ribbing 22, into which the conduit 31 is pressed, face towards the end 116 of the cable head 11 on the cable side. The knurled region is situated in a recess 113, which is formed at the circumference of the cable head 112 and into which the conduit is pressed.

The cooling water system is identified by the references 61, 611 and 612. The circulation (forward and return flow) of the cooling water is produced from the short-circuit on the electrode side of the two high current cables producing the circuit.

A list of references follows:
11 Cable head
111 Receiving means
112 (Connection side)
113 Knurled region/recess
114 Ribbed region
116 End on the cable side
21 Knurling
22 Saw tooth ribbing
221 Obtuse ribbing
222 Tooth flanks
31 Conduit
41, 42 Clips (cable clips)
61, 611,612 Cooling water system

The invention claimed is:

1. A compact cable head for assembly in a conduit of a water-cooled, high current cable, the compact cable head comprising:
    a cable side end comprising a receiving means for conductors;
    a first circumferential region configured with obtuse saw tooth ribbing configured to define tooth flanks facing towards the cable side end;
    said obtuse saw tooth ribbing adapted to be engaged by the conduit when said conduit pressed by clamps or clips that are affixed to the conduit about the said first circumferential region;
    a second circumferential region adjacent to the first circumferential region, the second circumferential region configured with a knurled circumferential face adapted to engage the conduit when the conduit is pressed against the second circumferential region by means of clamps or clips.

2. The compact cable head according to claim 1, wherein the first circumferential region is closest to the cable side end and the second circumferential region is furthest from the cable side end and is connected to the first circumferential region.

3. The compact cable head according to claim 2, characterized in that the knurled region of the cable head is situated in a recess configured at the circumference of the cable head.

4. The compact cable head according to claim 1, characterized in that the knurled region of the cable head is situated in a recess configured at the circumference of the cable head.

* * * * *